Patented Sept. 8, 1931

1,822,072

UNITED STATES PATENT OFFICE

WILLIAM BRYAN WIEGAND, OF SOUND BEACH, CONNECTICUT

ELECTRICAL INSULATION

No Drawing. Application filed March 13, 1930. Serial No. 435,675.

My invention relates to improvements in hydrocarbon insulating oils, and my invention includes new hydrocarbon insulating oil products having improved electrical properties as well as new methods of treatment to improve the electrical properties of hydrocarbon insulating oils.

I have discovered that carbon black, intimately contacted with hydrocarbon oil, contrary to accepted belief, operates, under appropriate conditions, to improve the electrical properties of hydrocarbon oils as insulating oils in several important respects and with several important advantages. This result seems to be due to a specific combination in carbon black of specific properties which coact to produce this unexpected result.

Carbon black is an electrical conductor; hence the accepted belief that, with respect to the electrical properties of insulators in which it might be dispersed, it operates to depreciate or destroy insulation values. The fact is that, under appropriate conditions, it operates to improve the electrical properties of hydrocarbon insulating oils. Carbon black has peculiar adsorptive capacities, for water and for electrolytes and possibly for particular components of the oil itself which depreciate the electrical properties of the oil, and also has peculiar capacities for removal of suspended material, as a filtering medium, which tend to explain this result.

Apparently carbon black not only adsorbs materials which depreciate the electrical properties of the oil but also renders them less active, while adsorbed, as deteriorating influences with respect to the electrical properties of the oil. This property of carbon black makes it possible to effect an improvement in the electrical properties of the oil in the presence of carbon black added to the oil if the amount of carbon black left in the oil is limited to an amount such that a stable dispersion free from substantial tendency toward agglomeration of carbon black particles is obtained.

I believe that this result is specific to carbon black because I have not been able to secure any comparable result substituting silica gel, another adsorptive agent, for carbon black. Using silica gel instead of carbon black, I found that the electrical properties of the oil were depreciated rather than improved.

However, I do not predicate my invention upon any particular hypothesis. My invention is predicated, rather, upon my discovery that the electrical properties of hydrocarbon insulating oil can be improved in several important respects and in a particularly advantageous manner by appropriate use of carbon black.

In referring to "carbon black" I intend to distinguish from "lamp black." The advantages of my invention are secured by the use of carbon black, not lamp black. Of the commercial carbon blacks, "micronex", for example, is suitable for use in carrying out my invention.

In treating hydrocarbon insulating oils to improve their electrical properties, according to my invention, the oil is brought into intimate contact with carbon black at a low rather than a high temperature, for example at a temperature not exceeding about 60° C. The improvement effected by the treatment of the oil with carbon black is usually greater if the treatment is carried out at lower temperatures, not exceeding about 40° C., or better not exceeding about 25° C. The proportion of carbon black used is not as important as the temperature at which the treatment is carried out; if the carbon black, and adsorbed material, is to be separated before the treated oil is applied electrically it is necessary merely that sufficient carbon black be used, an excess being unimportant except with respect to economy, but if the carbon black is to be left dispersed in the oil when it is applied electrically the proportion of carbon black left in the oil should be limited as previously noted.

If the carbon black, and adsorbed material, is to be separated before the oil is applied electrically, good results are usually secured using from 2% to 4% by weight of carbon black on the hydrocarbon oil subjected to treatment. Larger or smaller percentages, particularly the former, may be used in particular cases, however.

Dry carbon black is used with advantage in carrying out my invention.

It is not essential that the carbon black be absolutely dry, although better results are usually secured with drier carbon black. To the extent that the improvement of the electrical properties of the insulating oil depends upon dehydration, it is important that the adsorptive capacity of the carbon black for water be not exhausted.

The carbon black lends itself to simple and effective separation from the oil. In the pretreatment of oil, according to my invention, before it is applied electrically, an appropriate proportion of carbon black may be stirred into the oil and then separated therefrom by filtration, for example, or the oil may be circulated through a body of carbon black including a sufficient excess to effect the intended improvement in electrical properties, for example. The precise method of effecting intimate contact between the carbon black and the oil or of separating the carbon black and adsorbed material from the oil is not important.

Also, according to my invention, the insulating oil may be subjected to treatment with carbon black while in use. The insulating, and cooling, oil, in a transformer, for example, may be cyclically circulated from its point of application electrically, in contact with carbon black at a point remote from its point of application electrically and then back to its point of application electrically. Contact between the oil and the carbon black may be effected, for example, by circulating the oil through a body of carbon black. In so carrying out the invention, a temperature not exceeding about 60° C., for example, is advantageously maintained at the point of contact between the oil and the carbon black even though the oil may attain much higher temperatures at other points in the cycle.

Broadly, the new products of my invention include an electrical insulating oil the hydrocarbon oil product of the process of my invention. Except to the extent that it has better electrical properties than the usual insulating oil, I am unable at present to identify the improved insulating oil of my invention, broadly, other than by reference to treatment of the oil with carbon black.

The new products of my invention also include a new fluid electrical insulating compound comprising a hydro-carbon oil and a limited proportion of carbon black dispersed therein. I have found that with included proportions of carbon black so limited, any depreciation of the electrical properties of the insulating oil because of the presence of the carbon black is more than offset by the improvement effected. This new product of my invention can be prepared by thoroughly dispersing carbon black, for example, from 1% to 4% by weight, in hydrocarbon insulating oil, permitting the mixture to stand until equilibrium is substantially reached, for from 50 to 100 hours at 20–25° C. with an oil corresponding in viscosity to usual transformer oils, for example, and decanting the oil including the small proportion of carbon black remaining in dispersion from the precipitated material. The stability of the decanted oil dispersion may be improved by subjecting it to centrifuging. The proportion of carbon black remaining in dispersion in the oil may approximate, for example, 0.005% or 0.008% by weight.

My invention is of special value in improving the electrical breakdown strength of insulating oils. In some cases I have been able to increase the electrical breakdown strength of a particular hydrocarbon oil by more than 35% by treatment with carbon black in accordance with my invention. For example, I have been able by treatment of an oil having an electrical breakdown strength of about 32,000 volts with 3% by weight of carbon black at a temperature of 15–20° C. subsequently separated from the oil to increase its electrical breakdown strength to more than 45,000 volts. Again for example, I have been able by dispersion of 3% by weight of carbon black in an oil having an electrical breakdown, strength of about 27,000 volts followed by decantation of the oil from precipitated material to produce an oil containing about 0.0073% by weight of carbon black in dispersion having an electrical breakdown strength of more than 41,500 volts. (Standard method using 1 inch disks separated 1/10 inch). My invention is also of particular value in improving the insulation resistance and the power factor of insulating oils.

My invention has several further advantages. The action of the carbon black is extremely rapid. From the standpoint of water removal only, the time required for the conventional treatment with metallic sodium exceeds the time required for the treatment with carbon black necessary to effect the same dehydration by as much as ten to one hundred fold or more. Furthermore, I have been able further to improve by my invention the electrical properties of insulating oil which has been subjected to the conventional treatment with metallic sodium. The sludging and darkening usually incident to treatment with metallic sodium is also avoided. My invention further does not involve any heating of the insulating oil to be treated, thus avoiding any depreciation in electrical properties of the insulating oil frequently involved in chemical changes induced by heating of the oil. In applications in which the carbon black, and adsorbed material, is separated from the insulating oil the treatment of my invention has an important advantage in that meticulous control is not necessary. Carbon black, moreover, as previously noted, lends itself to simple and effective separation from the oil.

In one aspect my invention provides an improved method of dehydrating hydrocarbon insulating oils at low temperatures. By subjecting the oil to treatment with dry carbon black, water may be removed from the oil itself at ordinary temperatures avoiding, as just noted, any depreciation in electrical properties of the insulating oil involved in chemical changes, oxidation or polymerization for example, induced by heating of the oil, and it may be so removed in a very brief interval of time. Following treatment of the insulating oil with the carbon black, the carbon black and adsorbed water may be separated from the oil or, an appropriately limited proportion of carbon black may be left dispersed therein.

The improved insulating oils of my invention are generally useful for all the purposes for which insulating oils are commonly employed, transformer insulation and cooling, cable insulation, and the like.

I claim:

1. In the treatment of hydrocarbon insulating oils to improve their electrical properties, the improvement which comprises subjecting the hydrocarbon oil to treatment with carbon black at a temperature not exceeding about 60° C.

2. In the treatment of hydrocarbon insulating oils to improve their electrical properties, the improvement which comprises subjecting the hydrocarbon oil to treatment with carbon black at a temperature not exceeding about 40° C.

3. In the treatment of hydrocarbon insulating oils to improve their electrical properties, the improvement which comprises subjecting the hydrocarbon oil to treatment with carbon black at a temperature not exceeding about 25° C.

4. In the treatment of hydrocarbon insulating oils to improve their electrical properties, the improvement which comprises subjecting the hydrocarbon oil to treatment with carbon black and thereafter separating the carbon black and adsorbed material from the treated oil.

5. In the treatment of hydrocarbon insulating oils to improve their electrical properties, the improvement which comprises subjecting the hydrocarbon oil to treament with carbon black at a temperature not exceeding about 60° C. and thereafter separating the carbon black and adsorbed material from the treated oil.

6. In the treatment of hydrocarbon insulating oils to improve their electrical properties, the improvement which comprises cyclically circulating the hydrocarbon oil from the place where it is used for insulation into contact with carbon black at a point remote from the place where it is used for insulation and back to the place where it is used for insulation.

7. A fluid electrical insulating compound comprising a substantially stable dispersion of carbon black in hydrocarbon oil.

8. A fluid electrical insulating compound comprising a hydrocarbon oil and about 0.005–0.008% by weight of carbon black dispersed therein.

9. An electrical insulating oil comprising the hydrocarbon oil product resulting from the treatement of hydrocarbon oil with carbon black at a temperature not exceeding about 60° C.

10. An electrical insulating oil comprising the hydrocarbon oil product resulting from the treatment of hydrocarbon oil with carbon black at a temperature not exceeding about 40° C.

11. An electrical insulating oil comprising the hydrocarbon oil product resulting from the treatment of hydrocarbon oil with carbon black at a temperature not exceeding about 25° C.

12. In the treatment of hydrocarbon insulating oils to improve their electrical properties, the improvement which comprises dehydrating the hydrocarbon oil by treatment with dry carbon black at a temperature not exceeding about 60° C.

13. In the treatment of hydrocarbon insulating oils to improve their electrical properties, the improvement which comprises dehydrating the hydrocarbon oil by treatment with dry carbon black at a temperature not exceeding about 60° C. and thereafter separating the carbon black and adsorbed water from the oil.

14. In the treatment of hydrocarbon insulating oils to improve their electrical properties, the improvement which comprises subjecting the hydrocarbon oil to treatment with carbon black in amount exceeding that which will remain in dispersion in the hydrocarbon oil and thereafter separating the excess leaving a small amount of carbon black dispersed in the hydrocarbon oil.

In testimony whereof I affix my signature.

WILLIAM BRYAN WIEGAND.